United States Patent
Bhogal et al.

(10) Patent No.: US 8,041,724 B2
(45) Date of Patent: Oct. 18, 2011

(54) DYNAMICALLY MODIFYING A SEQUENCE OF SLIDES IN A SLIDESHOW SET DURING A PRESENTATION OF THE SLIDESHOW

(75) Inventors: Kulvir S. Bhogal, Fort Worth, TX (US);
Antony L. Cowan, Issaquah, WA (US);
Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/031,743

(22) Filed: Feb. 15, 2008

(65) Prior Publication Data

US 2009/0210796 A1    Aug. 20, 2009

(51) Int. Cl.
*G06F 17/30* (2006.01)
*G06F 7/00* (2006.01)
*G06F 3/00* (2006.01)

(52) U.S. Cl. .................................. 707/758; 715/730
(58) Field of Classification Search ........... 707/999.003, 707/758; 725/730–732; 715/730–732
See application file for complete search history.

(56) References Cited

U.S. PATENT DOCUMENTS

| | | | |
|---|---|---|---|
| 5,035,624 A | 7/1991 | Hosoya et al. | |
| 5,500,936 A | 3/1996 | Allen et al. | |
| 5,859,623 A | 1/1999 | Meyn et al. | |
| 6,008,807 A | 12/1999 | Bretschneider et al. | |
| 6,041,333 A | 3/2000 | Bretschneider et al. | |
| 6,108,001 A | 8/2000 | Tuttle | |
| 6,128,629 A | 10/2000 | Bretschneider et al. | |
| 6,308,168 B1 | 10/2001 | Dovich et al. | |
| 6,580,438 B1 | 6/2003 | Ichimura et al. | |
| 6,590,586 B1 | 7/2003 | Swenton-Wall et al. | |
| 6,717,591 B1 | 4/2004 | Fiveash et al. | |
| 6,774,920 B1 | 8/2004 | Cragun | |
| 6,836,870 B2 | 12/2004 | Abrams | |
| 6,957,389 B2 | 10/2005 | Faraday et al. | |
| 7,085,770 B2 | 8/2006 | Bennett, Jr. et al. | |
| 7,155,676 B2 | 12/2006 | Land et al. | |
| 7,240,287 B2 | 7/2007 | Qureshi et al. | |
| 7,266,773 B2 | 9/2007 | Dorwart | |
| 7,360,159 B2 | 4/2008 | Chailleux | |
| 7,434,153 B2 | 10/2008 | Liu et al. | |
| 7,512,887 B2 | 3/2009 | Keohane et al. | |
| 7,620,896 B2 * | 11/2009 | Miller et al. .................. | 715/730 |

(Continued)

OTHER PUBLICATIONS

USPTO U.S. Appl. No. 11/441,239, Image File Wrapper printed Aug. 17, 2010, 4 pages.

(Continued)

*Primary Examiner* — Kimberly Lovel
(74) *Attorney, Agent, or Firm* — Stephen J. Walder, Jr.; David A. Mims, Jr.

(57) ABSTRACT

Mechanisms for dynamically modifying a sequence of slides in a slideshow set during a presentation of the slideshow are provided. Tag metadata may be provided for each slide of a slideshow set such that this tag metadata may be used to establish logical subsets of slides within the slideshow set. Options may be provided for a user to select an interface item to obtain slides, from the current slideshow set or another slideshow set, that are associated with a currently displayed slide in the slideshow set. User interface items may be provided through which the user may temporarily redirect the sequence of the original slideshow set to incorporate one or more of these related slides and, upon termination of this "detour", may return to the point at which the sequence diverted.

16 Claims, 5 Drawing Sheets

U.S. PATENT DOCUMENTS

| | | | |
|---|---|---|---|
| 7,698,645 B2 * | 4/2010 | Fuse | 715/730 |
| 2001/0033296 A1 | 10/2001 | Fullerton et al. | |
| 2003/0222890 A1 * | 12/2003 | Salesin et al. | 345/629 |
| 2004/0017390 A1 | 1/2004 | Knowlton et al. | |
| 2004/0201610 A1 | 10/2004 | Rosen et al. | |
| 2005/0044499 A1 | 2/2005 | Allen et al. | |
| 2005/0055643 A1 | 3/2005 | Quimby | |
| 2005/0069225 A1 | 3/2005 | Schneider et al. | |
| 2005/0086200 A1 | 4/2005 | Kirkman et al. | |
| 2005/0091579 A1 | 4/2005 | Mewherter et al. | |
| 2005/0108619 A1 | 5/2005 | Theall et al. | |
| 2005/0138570 A1 | 6/2005 | Good et al. | |
| 2005/0273693 A1 | 12/2005 | Peterson | |
| 2005/0289453 A1 | 12/2005 | Segal et al. | |
| 2005/0289466 A1 | 12/2005 | Chen | |
| 2006/0059427 A1 | 3/2006 | Reid et al. | |
| 2007/0011616 A1 | 1/2007 | Ording et al. | |
| 2007/0038931 A1 | 2/2007 | Allaire et al. | |
| 2007/0055939 A1 | 3/2007 | Furlong et al. | |
| 2007/0101270 A1 | 5/2007 | Chianglin | |
| 2007/0124325 A1 | 5/2007 | Moore et al. | |
| 2007/0277106 A1 * | 11/2007 | Takriti et al. | 715/723 |
| 2009/0076834 A1 | 3/2009 | Rauber et al. | |

OTHER PUBLICATIONS

Advisory Action mailed Aug. 30, 2010 for U.S. Appl. No. 11/441,239; 3 pages.

Amendment under 37 CFR 1.116 filed with the USPTO on Aug. 18, 2010 for U.S. Appl. No. 11/441,239, 15 pages.

"Powerful PowerPoint Presentations", BNET, CNET Networks, Inc., Version 2, Sep. 13, 2006, http://jobfunctions.bnet.com/abstract.aspx?docid=259013&promo=100200, 21 pages.

Williams, Simon, "PowerPoint tips: perfect presentations", Personal Computer World, Oct. 31, 2003, http://www.vnunet.com/personal-computer-world/features/2045869/powerpoint-tips-perfect-presentations, 6 pages.

"About running a presentation on two monitors", Microsoft Office PowerPoint, Microsoft Corporation, http://office.microsoft.com/en-us/powerpoint/HP030893931033.aspx, 3 pages, 2002.

Create and distribute a self-running PowerPoint presentation, Microsoft Office PowerPoint, Microsoft Corporation, http://office.microsoft.com/en-us/powerpoint/HA010348171033.aspx, 10 pages, 2003.

Skiff, Sara, "Top 10 Hidden Features of PowerPoint for Litigators", TechnoLawyer Blog, http://blog.technolawyer.com/2006/10/top_10_hidden_f.html, 6 pages, 2006.

* cited by examiner

DYNAMICALLY MODIFYING A SEQUENCE OF SLIDES IN A SLIDESHOW SET DURING A PRESENTATION OF THE SLIDESHOW

BACKGROUND

1. Technical Field

The present application relates generally to an improved data processing system and method. More specifically, the present application is directed to a system and method for dynamically modifying a sequence of slides in a slideshow set during a presentation of the slideshow.

2. Description of Related Art

Slideshow software, such as Microsoft PowerPoint™ or the like, is almost universally used for any type of professional presentation. Such software allows a user to design slides to be presented via a display device. The software further provides an interface through which a user may present the slides, transitioning from one slide to the next typically based on the user providing an input indicating a desire to transition backward or forward through a series of slides.

A common problem for a presenter, i.e. a user of the slideshow software presenting information to a group of one or more people based on the series of slides, to lose track of time as the presenter is discussing topics associated with each slide in the series of slides. Moreover, it is also a very common situation for a presenter to have some slides in the series of slides that are far more important to the information that the presenter is trying to convey to the group than others.

Currently, when a presenter loses track of time during the presentation, it is common for the presenter to ungracefully skip over or spend an unnaturally short period of time on the less important slides. It is often the case that time runs out for the important slides and the presenter is left with the situation where information that he/she wished to cover during the presentation cannot be adequately addressed. The presenter is left saying something like "I really wish I had more time to cover SDO" or the like. Thus, the presenter is not able to always convey all of the important information that he/she wishes to convey in the time period allotted and there is no mechanism for aiding the presenter in making sure that this information is able to be included in the presentation based on the time period allotted.

In one prior art mechanism, a computer assisted presentation method and apparatus are provided in which the remaining time in a presentation is monitored in real time and the system dynamically adjusts the presentation to fit available time constraints. Numerical priorities are assigned to the presentation frames and minimum, goal, and maximum times are also assigned to each presentation frame. During the presentation to an audience, the presentation tool monitors the progress of the presentation and the time remaining. The presentation tool dynamically adjusts goal times to fit the remaining time allotted and, if necessary, deletes entire frames using the pre-assigned priorities.

In addition to this known mechanism, it should be noted that there have also been a number of recent improvements in slideshow software to help the presenter in performing the presentation. For example, in Microsoft PowerPoint™, the presenter may simply key in a slide number in order to jump from one slide to a different slide in the slideshow set without having to sequentially flip through each intervening slide. In "Powerful PowerPoint Presentations," BNET, Version 2, Sep. 13, 2006, various tips on how to enhance PowerPoint™ presentations are provided including associating recorded music with the slideshow set. In the article "PowerPoint tips: perfect presentations," Simon Williams, Personal Computer World, Oct. 31, 2003, a mechanism for recording the time that is spent on each slide in the slideshow is described so as to aid a presenter in timing their presentation during rehearsals.

Other improvements to slideshow software include the ability to run a presentation using two monitors (i.e. on a laptop and a projector) using a presenter view in which elapsed time may be shown (see PowerPoint "About Running a Presentation on Two Monitors," Microsoft Corporation). Moreover, PowerPoint™ may also be configured to provide a self-running presentation that automatically progresses through the slides of the slideshow set in sequential order based on custom slide timings (see "Create and Distribute a Self-Running PowerPoint Presentation," Microsoft Corporation).

SUMMARY

While each of the known mechanisms mentioned above provide an aid to users of slideshow software in generating and presenting material to an audience, one failing in these mechanisms is the inability to quickly, efficiently, and automatically redirect the sequence of a slideshow to a set of slides that are not in the original sequence or are at a later point in the sequence and return to an original sequence following this redirection. While some of the known mechanisms above allow a user to jump from one slide to another out of order, this is a completely manual process on the part of the user and requires the user to determine which slides in the slideshow set to jump to. Moreover, the user must manually return to an original slide and resume their presentation.

The illustrative embodiments provide a system and method for dynamically modifying a sequence of slides in a slideshow set during a presentation of the slideshow. With the system and method of the illustrative embodiments, tag metadata may be provided for each slide of a slideshow set such that this tag metadata may be used to establish logical subsets of slides within the slideshow set. The user, or an automated mechanism, may then manipulate the slide presentation using these tags and their associated logical subsets. For example, options may be provided for a user to select an interface item to obtain slides that are in one way or another associated with a currently displayed slide in the slideshow set. These slides may be present in the current slideshow set or in one or more different slideshow sets. Moreover, a user may establish a set of "optional" slides that are not included in the original slideshow set sequence to be presented during presentation of the information to an audience but are linked by way of the tag metadata to one or more slides within the slideshow set. Via this linkage, and the user interface items provided, the user may temporarily redirect the sequence of the original slideshow set to incorporate one or more of these related slides and, upon termination of this temporary "detour" in the sequence, may return to the point at which the sequence diverted or a next slide in the original slideshow set following the detour point.

For example, a virtual button may be provided for selecting "more like this," meaning that the slideshow sequence may temporarily be modified to detour to one or more optional slides, or slides appearing later in the slideshow sequence, that are associated with the current slide, in an out of sequence manner. Similarly, a virtual button or other user interface item may be provided for selecting "no more like this" such that other slides, either optional or appearing later in the slideshow sequence, that are related to the currently displayed slide may be automatically removed or not included in the modified slideshow set. The mechanisms of the illustrative embodiments may automatically and dynamically choose logical subsets of slides to remove or include based on the user or automated mechanism's activation of such options.

In one illustrative embodiment, a method for dynamically modifying a sequence of a slideshow set during a presentation of the slideshow set is provided. The method may comprise initiating presentation of an original slideshow set, receiving an input indicating a desire to modify a sequence of slides of the original slideshow set, and retrieving first metadata associated with a currently presented slide in the original slideshow set. The method may further comprise performing a search of slides or slideshow sets based on the first metadata to identify one or more related slides or slideshow sets having second metadata related to the first metadata, and modifying the sequence of slides of the original slideshow set based on the one or more related slides or slideshow sets. Modifying the sequence of slides of the original slideshow set may comprise at least one of adding one or more slides from the one or more related slides or slideshow sets to the sequence of slides of the original slideshow set or removing the one or more related slides or slideshow sets from the sequence of slides of the original slideshow set.

Moreover, modifying the sequence of slides of the original slideshow set may comprise spawning at least one additional thread for presenting the one or more related slides or slideshow sets, and performing a thread context switch operation to the at least one additional thread from a thread used to present the original slideshow set. Modifying the sequence of slides of the original slideshow set may further comprise presenting the one or more related slides or slideshow sets using the at least one additional thread. A same template as used to generate slides in the original slideshow set may be used when presenting the one or more related slides or slideshow sets.

The first metadata and second metadata may comprise one or more tags. The one or more tags may comprise at least one of pre-established subject matter identifiers, alphanumeric identifiers associated with particular topics, alphanumeric identifiers associated with projects or products, identifiers associated with portions of a project or product, or employee identifiers.

Performing a search of slides or slideshow sets based on the first metadata to identify one or more related slides or slideshow sets having second metadata related to the first metadata may comprise dynamically identifying the one or more related slides or slideshow sets based on an established taxonomy of metadata, and generating logical subsets of slides within the original slideshow set and the one or more related slides or slideshow sets. Modifying the sequence of slides of the original slideshow set based on the one or more related slides or slideshow sets may comprise presenting at least one user selectable graphical user interface element associated with a function for modifying the sequence of slides of the original slideshow set, receiving a user selection of one of the at least one user selectable graphical user interface element, and modifying the sequence of slides of the original slideshow set based on the user selection of one or the at least one user selectable graphical user interface element. One of the at least one user selectable graphical user interface element may be a graphical user interface element for accessing one of the one or more related slides or slideshow sets.

The one or more related slides or slideshow sets are part of a same file as the original slideshow set. The method may further comprise maintaining a record of the modification of the sequence of slides of the original slideshow set, and distributing a copy of the modified sequence of slides of the original slideshow set to one or more computing devices.

In other illustrative embodiments, a computer program product comprising a computer usable or recordable medium having a computer readable program recorded thereon is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE
ILLUSTRATIVE EMBODIMENTS

Figure 1:
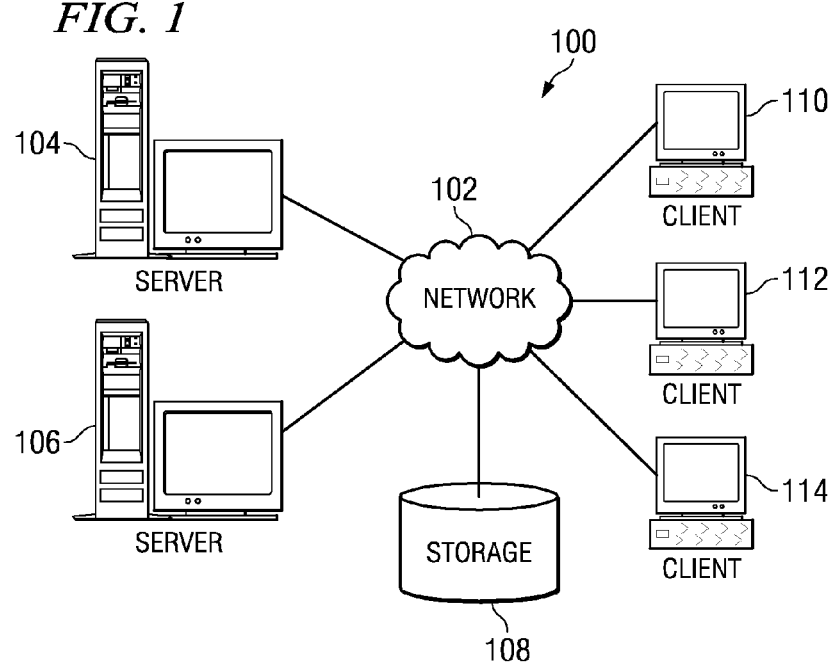
FIG. 1 is an exemplary representation of an exemplary distributed data processing system in which aspects of the illustrative embodiments may be implemented.
Figure 2:
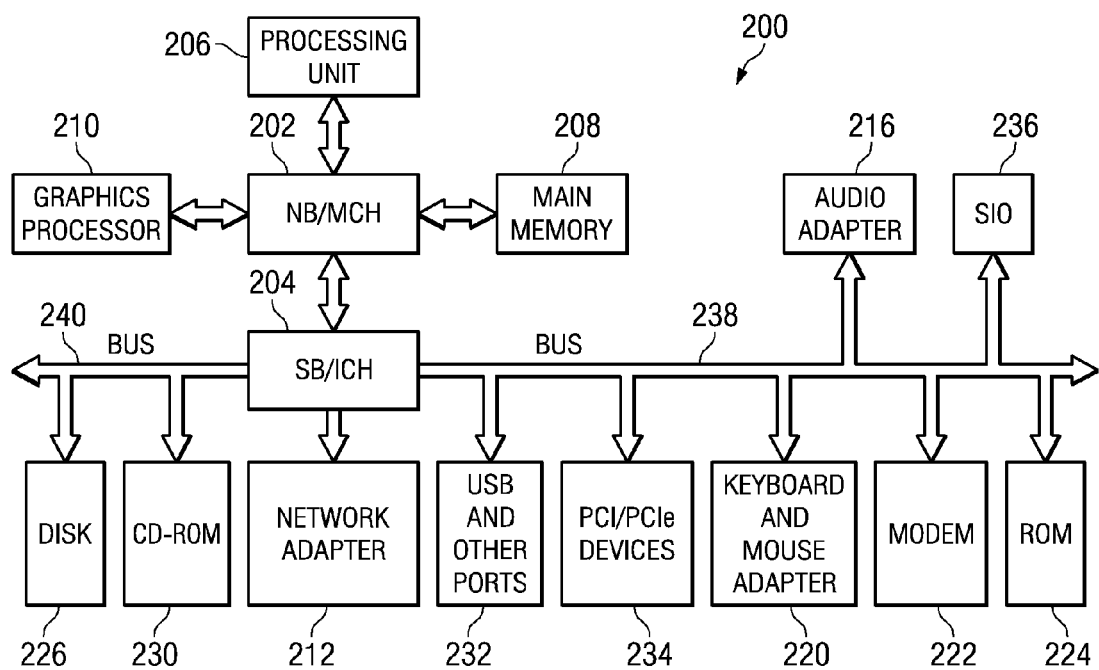
FIG. 2 is a block diagram of an exemplary data processing system in which aspects of the illustrative embodiments may be implemented.

The illustrative embodiments provide a system and method for dynamically modifying a sequence of slides in a slideshow set during a presentation of the slideshow set. In modern computing environments, such presentations of slideshows may be performed using a single computing device, such as a laptop computer, a computer coupled to an overhead projector system, or the like. Moreover, in modern computing environments, distributed presentation of a slideshow is also made possible such that the slideshow originates with one computing device and is distributed to one or more other computing devices via a data network in order to facilitate remote meetings to take place. Thus, in order to provide a context for the following description of the illustrative embodiments, FIGS. 1-2 are provided as examples of the possible data processing environments in which the illustrative embodiments may be implemented. It should be noted that the mechanisms of the illustrative embodiments are not limited to being implemented in a single computing device, although this is one possible implementation, and may be implemented in a distributed manner as well without departing from the spirit and scope of the present invention.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a system and method for dynamically modifying a sequence of slides in a slideshow set during a presentation of the slideshow. For example, a user of a first client computing device, such as client device 110 may establish one or more slideshow sets using slideshow software. For example, a user may create a set of slides using a program similar to Microsoft PowerPoint™ or other similar type slideshow program. The user may then establish a sequence of these slides, referred to as the slideshow set, for use in a presentation to an audience that may be either local to the client computing device 110 or remotely located by way of a data network, such as a data network 102.

With the system and method of the illustrative embodiments, in generating the slides using the slideshow software, tag metadata may be provided for each slide by which to associate the slides with other slides in the same or a different slideshow set. This tag metadata may take the form of a set of pre-established subject matter identifiers, alphanumeric identifiers associated with particular topics, alphanumeric identifiers associated with projects or products, identifiers associated with portions of a project or product, employee identifiers, or any other context or subject matter based identifier. Moreover, the tag metadata may be, or include, "speaker notes" associated with slides of the slideshow set, such speaker notes being similar to those generated in such known presentation software such as Microsoft PowerPoint™ or the like. This tag metadata associated with the slides may be used to dynamically identify related slides when a corresponding request is received by a user or automatically generated. For example, slides having the same tag metadata, or tag metadata that is related via a taxonomy of tag metadata, e.g., a hierarchy of tag metadata categories and subcategories, may be automatically identified based on the tag metadata dynamically during a presentation of a slideshow set to an audience.

The tag metadata may be used to establish logical subsets of slides within the slideshow set or between slideshow sets. The user, or an automated mechanism, may then manipulate the slide presentation using the tag metadata and their associated logical subsets. For example, options may be provided for a user to select an interface item to obtain slides that are in one way or another associated with a currently displayed slide in the slideshow set. These slides may be present in the current slideshow set or in one or more different slideshow sets. Moreover, a user may establish a set of "optional" slides that are not included in the original slideshow set sequence to be presented during presentation of the information to an audience but are linked by way of the tag metadata to one or more slides within the slideshow set. Via this linkage, and the user interface items provided, the user may temporarily redirect the sequence of the original slideshow set to incorporate one or more of these related slides and, upon termination of this temporary "detour" in the sequence, may return to the point at which the sequence diverted or a next slide in the original slideshow set following the detour point.

For example, a virtual button may be provided on the client computing device 110 for selecting "more like this," meaning that the slideshow sequence may temporarily be modified to detour to one or more optional slides, slides in another slideshow set, or slides appearing later in the slideshow sequence, that are associated with the current slide, in an out of sequence manner. Similarly, a virtual button or other user interface item may be provided for selecting "no more like this" such that other slides, either optional, in another slideshow set, or appearing later in the slideshow sequence, that are related to the currently displayed slide may be automatically removed or not included in the modified slideshow set. The mechanisms of the illustrative embodiments may automatically and dynamically choose logical subsets of slides to remove or include based on the user or automated mechanism's activation of such options.

In response to selecting one of these user interface options to modify the sequence of the slideshow set to incorporate slides not originally present in the slideshow sequence or to immediately access a subset of slides appearing at a later time in the slideshow sequence, i.e. performing a "detour" of the original slideshow sequence, commands and/or data may be sent to the other client computing devices 112 and 114 with which the presentation is being distributed. The slide data may alternatively be distributed prior to the presentation and only commands may need to be sent to cause the slideshow software on each of the client computing devices 112 and 114 to display the related slides identified by the tag metadata. Of course, in an implementation in which the audience for the presentation is local to the client computing device 110, distribution of data and commands to remotely located client computing devices 112 and 114 may not be needed since a local display will be used to present the slides to the audience of the presentation. Of course a combination of remotely distributed and local presentation of the slides may also be used without departing from the spirit and scope of the present invention. In such a case, a combination of the above-described mechanisms may be used.

In addition to the slideshow software of the illustrative embodiments being run at the client computing device 110 and either locally providing the presentation to a local audience, distributing the presentation to remotely located and distributed audience via the client computing devices 112 and 114, or both, a more centralized mechanism may be used, such as via a server 104 or 106. That is, the slideshow software of the illustrative embodiments may run on the server 104 or 106 and may be accessed by a user of a client computing device 110 to facilitate a local, remote, or local and remote, presentation to an audience. In such an embodiment, the client computing device 110 is not required to have the slideshow software loaded an running on their client computing device 110 and other remotely located client computing devices 112-114 may log into the server 104 or 106 as audience participants in order to receive the presentation. In this embodiment, the server 104 or 106 may orchestrate the distribution of the presentation to the client computing devices 112-114 as well as perform the other operations characteristic of the present invention as described hereafter.

Essentially, during a presentation, a user may encounter a slide in an originally established slideshow set sequence that has information, subject matter, an author or personnel, or the like for which additional information is desired. This original slideshow set sequence may be presented in a first thread executing on the client computing device 110. An interface through which the originally established slideshow set sequence is presented may have one or more interface items through which a user may request that related slides in the same or different slideshow set be presented. In response to a user selecting one of these interface items, tag metadata associated with the currently displayed slide may be retrieved and used as a basis for performing a search for related slides in the same and/or a different slideshow set. The search may result in one or more slides or slideshow subsets having similar or related tag metadata being retrieved.

The identification of related slides or slideshow subsets may further be facilitated by an established taxonomy of tag metadata. For example, the tag metadata taxonomy may be established as a hierarchy or tag metadata in which parent/child relationships may be established for related tag metadata. Thus, tag metadata of the currently displayed slide may be used to identify other slides and/or slide sets having the same tag metadata or tag metadata that is related to the tag metadata via the parent child relationship in the established taxonomy. In one illustrative embodiment, any slides or slideshow sets having tag metadata that is the same as the tag metadata of the currently displayed slide or that is a child of the tag metadata of the currently displayed slide may be returned as a result of the search.

Other slides and/or slideshow sets identified as part of the results of the search may be used to spawn one or more additional threads on the client computing device 110. The user of the client computing device 110, or an automated mechanism of the client computing device, may then switch thread contexts from the original slideshow sequence thread to an alternative thread for one or more of the related slides and/or slideshow sets. If a single related slide or slideshow set is identified through the search, then the current slide display may be automatically switched over to the first slide in the related slides or slideshow set. Once the end of the related slides or slideshow set is encountered, or in response to a user input, the thread context may be automatically switched back to the original slideshow sequence thread so that the presentation may then proceed from the point at which the sequence of slides detoured to the related slide(s) or slideshow set. Alternatively, rather than returning to the exact point at which the sequence of slides detoured, the return may be performed to a next slide in the original slideshow sequence from the slide that was used as a basis for the detour. In this way, the presentation may be progressed to the next slide after having taken the detour in slideshow sequence.

It should be noted that it may be the situation that related slides and/or slideshow sets may be identified from a plurality of different sources, i.e. different files, different slideshow sets, different computing devices, and the like. Moreover, different related slides and/or slideshow sets may be identified based on related tag metadata and not necessarily an exact match of the tag metadata, such as in the case of a taxonomy being utilized. Based on the source and/or particular tag metadata causing the slide(s) and/or slideshow set(s) to be returned in the results, different threads may be spawned for these results. Selection options may be presented to the user of the client computing device 110 for selecting which thread or threads the user wishes to detour to during the presentation. For example, if one related slideshow set is returned because of the tag metadata being "WebSphere" and another related slideshow set is returned because of the tag metadata "Remote Backup System" which is a child of the tag metadata "WebSphere," an option may be displayed for each of the resulting threads with an appropriate label indicating the tag metadata associated with that thread, e.g., one option having a label of "WebSphere" and another option having a label of "WebSphere/Remote Backup System." The user may then make use of this information to determine which slide(s) or slideshow set(s) the user wishes to detour the original slideshow sequence to during the presentation. The user may select the appropriate option(s) and then have the slide(s) or slideshow set(s) associated with that option automatically presented.

Once the user transitions from a last slide in the slide(s) or slideshow set(s), the thread context may be automatically switched back to the original slideshow sequence thread, either at the slide causing the detour or at a next slide in the slideshow sequence. A record of the slide(s) or slideshow set(s) that are followed by the user may be maintained in the user's computing device so that at the end of the presentation, a copy of the presentation as presented, including the original presentation and any detours to other slide(s) or slideshow set(s) not in the original presentation slideshow set, may be generated for distribution to attendees or other individuals' computing devices. Thus, when the user makes detours during the presentation, these detours are tracked by maintaining this record and the resulting copy of the presentation is a compilation of the slides from the original slideshow set and the detours with the detours being inserted into the original slideshow set at the places where they were presented during the presentation.

In addition, it should be appreciated that when detours to other slide(s) or slideshow set(s) are performed, these other slide(s) or slideshow set(s) may have been created using different templates, e.g., borders, backgrounds, color schemes, etc. With the mechanisms of the illustrative embodiments, when performing a detour, the original template is maintained during the detour such that the other slide(s) or slideshow set(s) appear to be part of the original slideshow set with regard to their template characteristics, e.g., borders, backgrounds, etc. That is, the template from the original slideshow set is maintained and only the content of the detoured slide(s) or slideshow set(s) is superimposed on the maintained template.

Thus, the mechanisms of the illustrative embodiments allow for dynamic modification of a slideshow sequence by detouring the sequence to one or more slides in the same or a different slideshow set temporarily and automatically returning to the original slideshow sequence following the detour. The automated mechanisms of the illustrative embodiments handle the identification of related slide(s) and slideshow set(s), the transitioning to a thread for handling the detour to the related slide(s) and slideshow set(s), and the return to the original slideshow set sequence. This provides a great improvement over known mechanisms which require the user to identify what slide they wish to jump to in a slideshow presentation and what slide to return to once they are done with their jump to another slide in the slideshow presentation. Moreover, the mechanisms of the illustrative embodiments allows detours to slide(s) or slideshow set(s) in different slideshow sets, files, on different computing devices, or the like, than the original slideshow set. Such an ability is not provided in any known mechanism which are generally limited to jumping to slides within a pre-established slideshow.

Figure 3:
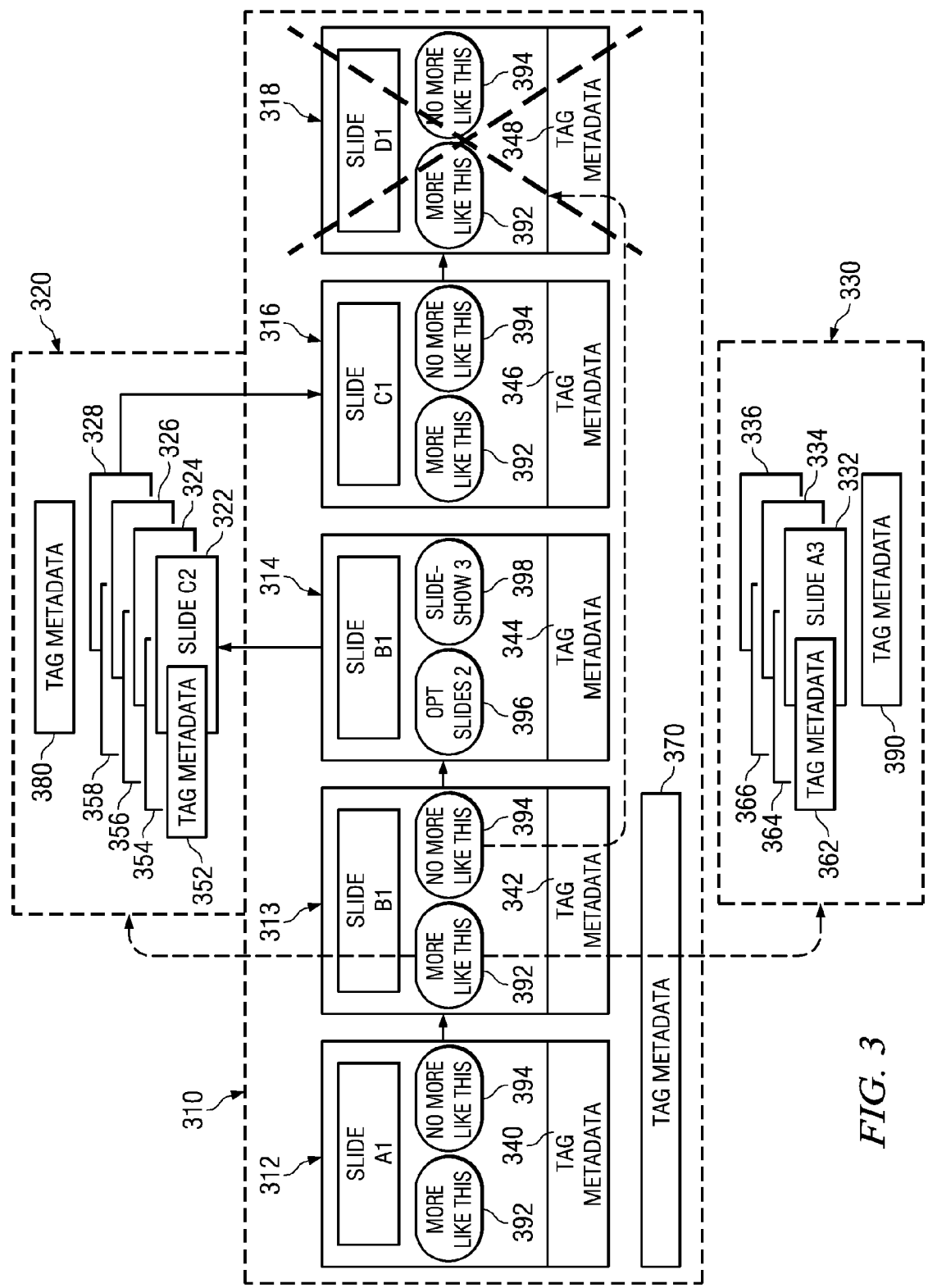
FIG. 3 is an exemplary diagram illustrating a temporary slideshow set sequence modification in accordance with one illustrative embodiment.

FIG. 3 is an exemplary diagram illustrating a temporary slideshow set sequence modification in accordance with one illustrative embodiment. As shown in FIG. 3, an original slideshow set sequence 310 comprises slides 312-318. In addition, an optional slideshow set 320 is provided either as part of the same file as the original slideshow set sequence 310 or in a different file from that of the original slideshow set sequence 310 on the same or different computing device. If the optional slideshow set 320 is present in the same file as the original slideshow set sequence 310, it is not included in the original slideshow set sequence 310 and is maintained separate such that, without a detour of the sequence, the optional slides in the optional slideshow set 320 would not be presented as part of the original slideshow set sequence 310.

A second slideshow set 330 may also be provided. This second slideshow set 330 may have been developed separate from the original slideshow set sequence 310 and, other than having similar tag metadata or tag metadata that is related by way of a tag metadata taxonomy, may not be related to the original slideshow set sequence 310. The second slideshow set 330 will typically be provided as a separate file or files on the same or different computing device. Each of the slides 312-318, 322-328, and 332-336 of the slideshow sets 310-330 may have associated tag metadata 340-366 which may be used by the mechanisms of the illustrative embodiments to identify related slide(s) and slideshow set(s). Moreover, tag metadata 370-390 may be associated with each slideshow set 310-330 based on the tag metadata of the slides within the slideshows sets 310-330.

As shown in FIG. 3, when the slides 312-318 are presented as part of the original slideshow set sequence 310, the user interface for presenting the slides includes user interface items 392 and 394 for the user selecting to either retrieve slides/slideshows related to the currently displayed slide, e.g., "more like this" virtual button 392, or to remove slides from the slideshow set sequence 310 that are related to the currently displayed slide, e.g., "no more like this" virtual button 394. In response to a user selecting the user interface item 392, the tag metadata 344 associated with the currently displayed slide 314 may be used as a basis to perform a search of the same and/or different computing systems, such as computing systems coupled by way of a data network. For example, a search based on the tag metadata 344 may result in slides within the slideshow sets 320 and 330 being determined to be related to the slide 314. This determination of related slides may be based on the tag metadata associated with the slideshow set 320, 330 and/or tag metadata associated with the individual slides in the slideshow sets 320 and 330.

In response to obtaining the results of the search, user interface items 396 and 398 may be displayed in a selectable manner for selecting which slideshow set 320 or 330 to detour to during the original slideshow set sequence 310. As shown in FIG. 3, the user interface items 396 and 398 preferably have labels for describing the tag metadata used to identify the slideshow sets 320 and 330 as related to the slide 314. Of course other labels may be used, such as based on the content of the slideshow sets 320 and 330, titles of the slideshow sets 320 and 330, or the like, for providing some basis upon which the user may decide which slideshow set 320 or 330 to detour to.

If the user selects user interface item 396, for example, the original slideshow set sequence 310 is detoured to the slideshow set 320 from the slide 314. This may be done, for example, by using separate threads for each of the slideshow sets 310-330 and performing thread context switch operations. Once the user transitions from the last slide in the related slideshow set 320, or the user selects a user interface item to return to the original slideshow set sequence 310, a thread context switch is made back to the original slideshow set sequence 310 thread. This transition back to the original slideshow set sequence 310 thread may be made back to the slide 314 that caused the detour or to a next slide 316 in the original slideshow set sequence 310. The original slideshow set sequence 310 may then resume through slides 316-318. Of course the mechanisms of the illustrative embodiments may be performed again with each subsequent slide 316-318 such that additional detours may be performed.

It should also be appreciated that the related slide searches of the illustrative embodiments and the detouring of the slideshow sequence may be performed in an iterative manner such that once a slideshow set sequence detour is taken, another detour from this detour may also be taken using this same mechanism. Of course a limit on the number of detours may be established such that long tangents away from the original slideshow set sequence 310 may be avoided.

The manner by which the slides of the slideshow set sequence detour, i.e. slideshow set 320 or 330, are displayed to the user of the client device, the audience, and/or the audience's client devices, may be made such that it is conspicuous that the slides are from a related slideshow set and not the original slideshow set 310. For example, the slides of the slideshow set 320 or 330 that are part of the detour in sequence may be displayed in a cascaded manner from the original slide 314 that is the branching point for the detour. The slides of the slideshow set 320 or 330 may alternatively or also be displayed in a smaller size than the original slide 314, different shading, with highlighting applied, different border color, or any other known manner for accentuating an image over other images on a computer display device.

Alternatively, the slides of the slideshow set 320 or 330 may be displayed in a manner that makes them appear to be part of the original slideshow set sequence 310. For example, when detours to other slide(s) or slideshow set(s) are performed, these other slide(s) or slideshow set(s) may have been created using different templates, e.g., borders, backgrounds, color schemes, etc. When performing a detour, the original template is maintained during the detour such that the other slide(s) or slideshow set(s) appear to be part of the original slideshow set with regard to their template characteristics, e.g., borders, backgrounds, etc. That is, the template from the original slideshow set is maintained and only the content of the detoured slide(s) or slideshow set(s) is superimposed on the maintained template.

As shown in FIG. 3, another user selectable option for modifying the original slideshow set sequence 310 is to remove slides in the original slideshow set sequence 310 that are related to a currently displayed slide 314 using the user interface item 394. In response to a user selecting this user interface item 394, the tag metadata 344 associated with the slide 314 is used to perform a search of the tag metadata 346-348 of other slides appearing in the original slideshow set sequence 310 after the current slide 314. Again, this search may be done, as with the previously described searches, based on an exact matching criteria such that tag metadata must exactly match, or a taxonomy of tag metadata may be established with related tag metadata being specified in the taxonomy, such as by way of a hierarchical arrangement. Since this action by the user will result in information being removed from the original slideshow set sequence 310, it is often beneficial to limit such searches to exact matches since it may not be desirable to remove slides directed to related matters but not the exact same matter, which could result in too much information being removed from the original slideshow set sequence 310.

If any slides in the original slideshow set sequence 310 after the current slide 314 have tag metadata 346-348 that matches the tag metadata 344 of the current slide 314, then those slides may be automatically deleted from the original slideshow set sequence 310 to generate a modified slideshow set sequence 310. Such removal may entail setting a field associated with the slides with a value indicating that the slide is not to be displayed as part of the slideshow set sequence 310, for example. Any mechanism for communicating with the slideshow software that informs the slideshow software to not display the slides identified through the tag metadata search may be used without departing from the spirit and scope of the illustrative embodiments.

As a further illustrative embodiment, a timing mechanism may be incorporated into the slideshow software for monitoring an elapsed time of the presentation relative to a time limit or goal time for the presentation in order to monitor the progress of the user through the original slideshow set sequence 310. A similar mechanism is described in commonly assigned U.S. Pat. No. 6,774,920. Based on the elapsed time relative to the time limit, and a pre-established criteria, such detours in the slideshow set sequence 310 to slideshow sets 320 or 330 may be inhibited, although a user selectable option to override such inhibitions may also be provided. For example, if the user has only progressed 1/3 of the way through the original slideshow set sequence 310 but has used 2/3 of the time allotted for the presentation, then such detours may be inhibited so that it is more likely that the user will be able to cover the remaining slides in the original slideshow set sequence 310. An indicator of this inhibition may be displayed to the user at his client computing device, but may not be distributed to audience participants computing devices. Of course, the user may determine that a detour is more important than the risk of not being able to get to the remaining slides in the original slideshow set sequence 310 and may manually override the inhibition, such as via a user interface item, at which point the mechanisms previously described above may operate.

It may be the case following a presentation that one or more attendees of the presentation, or other individuals, may request a copy of the slideshow used as part of the presentation. Thus, with the mechanisms of the illustrative embodiments, the user's computing device may maintain a record of the slide(s) or slideshow set(s) that are followed by the user so that at the end of the presentation, a copy of the presentation as presented, including the original presentation and any detours to other slide(s) or slideshow set(s) not in the original presentation slideshow set, may be generated for distribution to attendees or other individuals' computing devices. Moreover, if any slides in the original presentation slideshow set are removed during the presentation, such as by selecting a "no more like this" user interface element 394, these slides may be removed from the version of the presentation distributed to the attendees and other individuals. Thus, when the user makes detours during the presentation, these detours are tracked by maintaining this record and the resulting copy of the presentation is a compilation of the slides from the original slideshow set and the detours with the detours being inserted into the original slideshow set at the places where they were presented during the presentation.

Thus, the mechanisms of the illustrative embodiments allow an original slideshow set sequence 310 to be automatically modified in response to a user request to either detour to one or more related slides or slideshow sets in the same or different slideshow set sequence 310, or to remove slides in the original slideshow set sequence 310, that are related to a slide in the original slideshow set sequence 310 from with which the user request is associated. This allows a user or presenter of information to follow important tangents to further explain information associated with a currently displayed slide using slides or slideshow sets that were not originally included in the original slideshow set sequence 310, for example. Moreover, the mechanisms of the illustrative embodiments allow a user to jump to other portions of the same slideshow set sequence 310, either before or after a current slide 314 in the slideshow set sequence 310, that are automatically determined to be related to the current slide 314 based on tag metadata, and then return to the branch point, i.e. the current slide 314, using a single user interface item.

Figure 4:
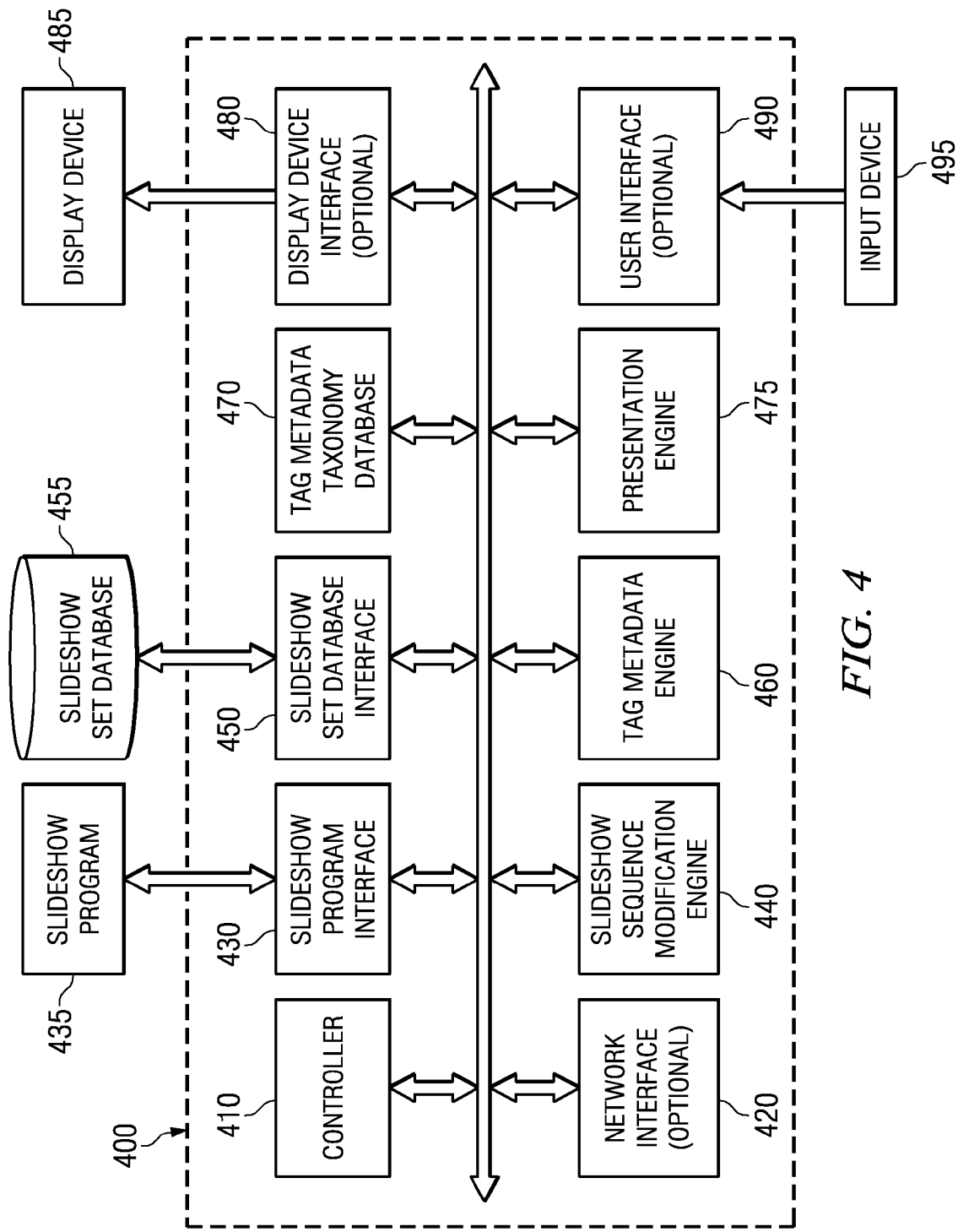
FIG. 4 is an exemplary diagram illustrating the primary operational elements of a presentation engine in accordance with one illustrative embodiment.

FIG. 4 is an exemplary diagram illustrating the primary operational elements of a slideshow presentation engine in accordance with one illustrative embodiment. The elements shown in FIG. 4 may be implemented in hardware, software, or any combination of software and hardware. In one illustrative embodiment, the elements shown in FIG. 4 may be implemented as software instructions executed on one or more data processing devices. Alternatively, various ones of the elements shown in FIG. 4 may be implemented as specialized hardware devices, such as Application Specific Integrated Circuits (ASICs) or the like.

As shown in FIG. 4, the slideshow presentation engine 400 includes a controller 410, an optional network interface 420, a slideshow program interface 430, a slideshow sequence modification engine 440, a slideshow set database interface 450, a tag metadata engine 460, a tag metadata taxonomy database 470, a presentation engine 475, an optional display device interface 480, and an optional user interface 490. The controller 410 controls the overall operation of the slideshow presentation engine 400 and orchestrates the operation of the other elements 420-490.

The network interface 420 provides a communication mechanism through which a user may access the functionality of the various elements 410 and 430-490 of the slideshow presentation engine 400. The network interface 420 further provides a communication mechanism through which the slideshow presentation engine 400 may send data and commands to other computing devices as well as receive data and commands from the other computing devices in order to perform the various functions described previously using the elements 430-490. The network interface 420 is optional in that in some illustrative embodiments, in which only local presentations are supported, a network interface 420 is not necessary since the computing device upon which the slideshow presentation engine 400 is running does not need to communicate with other computing devices via a data network. However, in embodiments in which there is a presentation distributed to remote computing devices or in which the user needs to access a server upon which the slideshow presentation engine 400 is running from a remotely located client computing device, the network interface 420 is necessary to facilitate such communication.

The slideshow program interface 430 provides a communication interface through which the slideshow presentation engine 400 may interact with a slideshow program or software 435. For example, the slideshow program interface 430 may provide the necessary code, application program interfaces (APIs), or the like for communicating with legacy slideshow software 435, such as Microsoft PowerPoint™ or the like. The slideshow program or software 435 may support the functionality for associating tag metadata with slides of slideshow sets. Alternatively, the slideshow program interface 430 provides the communication interface through which a user of a slideshow program 435 may obtain access to this tag metadata functionality that may be provided via the tag metadata engine 460.

The slideshow sequence modification engine 440 provides the logic and functionality for dynamically modifying a slideshow sequence, such as to take a detour to follow a separate set of slides of a separate slideshow set, to remove slides from an original slideshow set sequence, or the like, as previously described, based on results of tag metadata searches performed by the tag metadata engine 460. As described above, based on a search of tag metadata associated with a current slide at the time that a user selects a user interface item for performing a modification of the original slideshow set sequence, one or more slides or slideshow sets having tag metadata matching the tag metadata of the current slide, or otherwise determined to be related to the tag metadata of the current slide, such as through the use of a tag metadata taxonomy database 470, may be identified. The user may then be presented with the option to display these related slides or slideshow sets as detours from the original slideshow set sequence with automatic return to the current slide or the next slide in the original slideshow set. Alternatively, a user may select a user interface item for removing slides further in the original slideshow set sequence that have matching tag metadata. These operations are facilitated by the slideshow sequence modification engine 440.

The slideshow set database interface 450 provides a communication mechanism for accessing slideshow sets in a slideshow set database 455. The slideshow sets preferably have been created having tag metadata associated with either the slideshow sets, the slides within the slideshow sets, or both. The slideshow sets may be established using the slideshow program or software via the slideshow program interface 430. The tag metadata may be associated with the slideshow sets and/or slides either within the slideshow program or software or using the tag metadata engine 460. The slideshow set database 455 may be searched by the tag metadata engine 460 in response to a user selecting a user interface item for modifying the original slideshow set sequence. Slides and/or slideshow sets having tag metadata related to the tag metadata of the slide initiating the search may be identified and returned for use in modifying the original slideshow set sequence.

The tag metadata engine 460 provides the functionality for associating tag metadata with slides and/or slideshow sets as well as performing searches of tag metadata to identify related slides and/or slideshow sets. The tag metadata engine 460 may make use of a database of established tag metadata (not shown) that may be searched or may permit a free-form type tag metadata that may be searched using string comparisons or the like. The tag metadata engine 460 may make use of an established tag metadata taxonomy in the database 470 for performing such searches, as previously described. Results of such searches may be used to provide options to a user for determining how to modify an original slideshow set sequence.

The presentation engine 475 provides the logic and functionality for generating the presentation displays of the slides and slideshow sets with the user interface items for accessing the functionality of the illustrative embodiments. The presentation engine 475 presents slides via a display device 485 through the optional display device interface 480, such as for local presentations, or distribution through a data network to remote computing devices via the network interface 420. In presenting the slides, the presentation engine 475 may further receive user commands, such as from an input device 495, via the optional user interface 490 for progressing through the slideshow set and/or accessing the user interface items for obtaining the functionality of the illustrative embodiments. The presentation engine 475 may operate in conjunction with the tag metadata engine 460 to perform tag metadata searches, return results via user interface items, and communicate user selections of user interface items for modifying the slideshow set sequence. The presentation engine 475 may further operate to present the detour of the slideshow set sequence to other slides and/or slideshow sets that were not present in the original slideshow set sequence along with user interface items for returning to the original slideshow set sequence and/or perform additional detours to other related slides and slideshow sets.

As mentioned above, the presentation engine 475 may further be equipped with an elapsed time measurement mechanism for tracking the elapsed time since the initiation of the presentation of the original slideshow set sequence and compare that elapsed time with an allotted time for the presentation. Based on this comparison, and one or more established thresholds, the presentation engine 475 may inhibit the ability of a user to search for related slides and/or slideshow sets in order to take detours from the original slideshow set sequence. Moreover, the presentation engine 475 may provide user interface items for overriding this inhibiting of the functionality of the illustrative embodiments to take detours.

Figure 5A:
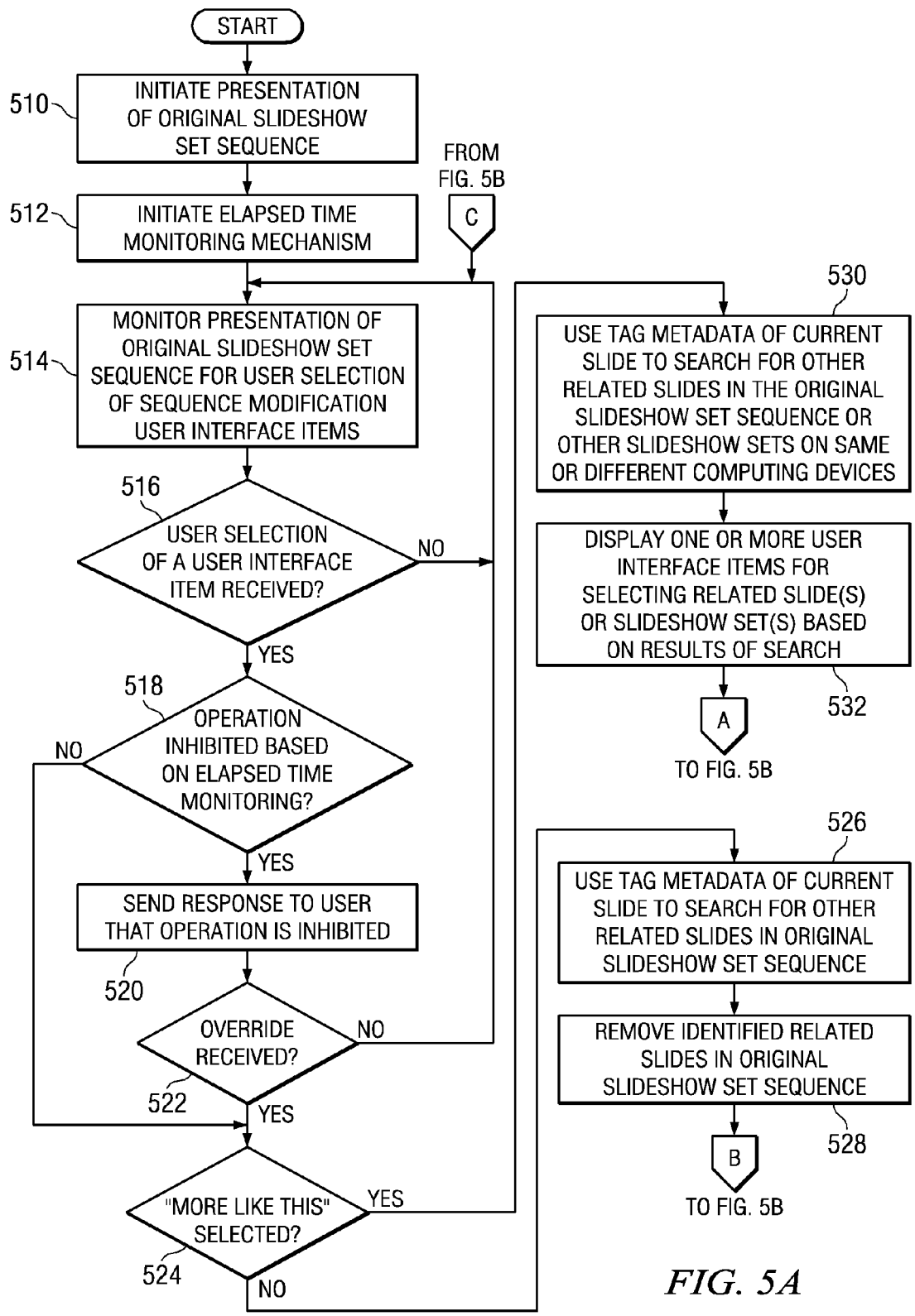
FIGS. 5A and 5B illustrate a flowchart outlining an exemplary operation for performing a temporary slideshow set sequence modification, or "detour," in accordance with one illustrative embodiment.
Figure 5B:
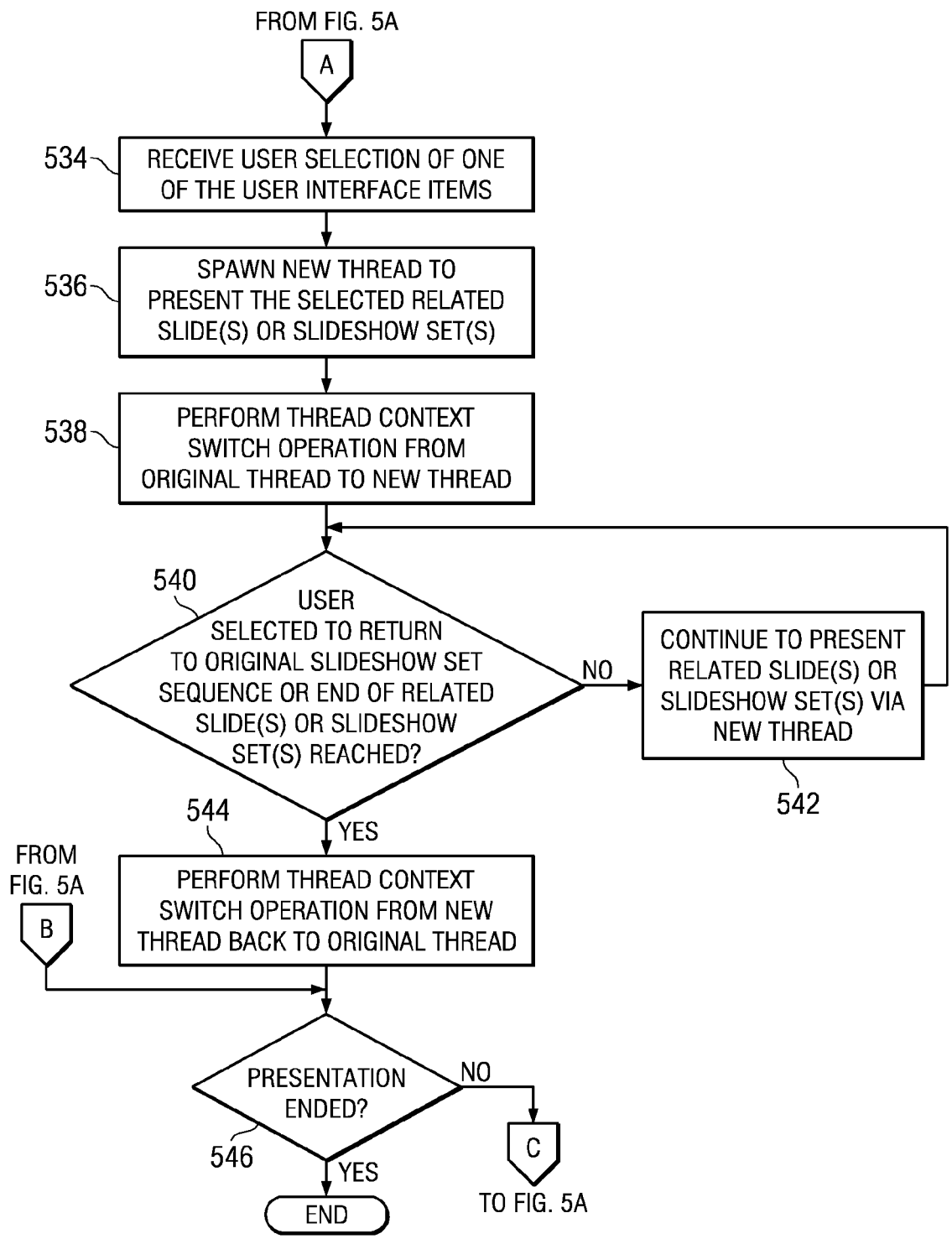

FIGS. 5A and 5B illustrate a flowchart outlining an exemplary operation for performing a temporary slideshow set sequence modification, or "detour," in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIGS. 5A and 5B, the operation starts with the initiation of a presentation of an original slideshow set sequence (step 510). An elapsed time monitoring mechanism is started based on the allotted time for the presentation, which may be specified as an attribute of the slideshow set, and established thresholds for modifying an operation of the functions of the illustrative embodiments (step 512). Monitoring of the presentation of the original slideshow set sequence for user selections of sequence modification user interface items is performed while the user is progressing through the original slideshow set sequence (step 514). A determination is made as to whether a user's selection of one of these user interface items is received (step 516). If a user selection of one of these user interface items is not received, the operation returns to step 514.

If a user selection of one of these user interface items is received, a determination is made as to whether this operation should be inhibited based on the elapsed time of the presentation, the allotted time for the presentation, and one or more established thresholds (step 518). If the operation is to be inhibited, a response is provided to the user indicating that the operation should not be taken due to time constraints (step 520). A determination is made as to whether the user selects an option to override this inhibiting of the operation (step 522). If an override user input is received, or if the operation is not to be inhibited in the first place, the operation continues to step 524. If the user does not override the inhibiting of the operation, then control flows back to step 514.

A determination is made as to whether the user interface item is one to retrieve more slides similar to a currently displayed slide, i.e. a "more like this" user interface item (step 524). If the user selection is not of a "more like this" user interface item, then it is determined that the user interface item that was selected is a "no more like this" user interface item requesting that related slides within the original slideshow set sequence be removed. Accordingly, tag metadata of a currently displayed slide in the original slideshow set sequence is used as a basis to search for other slides in the same slideshow set sequence that have matching or related tag metadata (step 526). The matched or related slides identified in step 526 are then removed from the original slideshow set sequence such that they are not displayed when they are transitioned to and instead a next slide, if any, that is not marked for non-display is presented (step 528). The operation then continues to step 546, described hereafter.

If the user selection is of a "more like this" user interface item (step 524), the tag metadata of the currently displayed slide in the original slideshow set sequence is used as a basis to search for other slides or slideshow sets having matching tag metadata or related tag metadata (step 530). Based on the results of the search, one or more user selectable user interface items may be displayed for selecting which related slides or slideshow sets to detour the original slideshow set sequence to (step 532). A user input of a selection of one of the user interface items is received (step 534) and a new thread is spawned to present the related slide(s) or slideshow set(s) corresponding to the received user input (step 536). A thread context switch is then performed from a current thread for presenting the original slideshow set sequence to the new thread (step 538).

A determination is made as to whether a user has selected to return to the original slideshow set sequence or if an end of the related slide(s) or slideshow set(s) has been encountered (step 540). If not, the operation continues to present the related slide(s) or slideshow set(s) via the new thread (step 542) and the operation returns to step 540. If the user has selected to return to the original slideshow set sequence or an end of the related slide(s) or slideshow set(s) has been encountered (step 540), then a thread context switch is performed back to the original thread for presenting the original slideshow set sequence (step 544). The thread context switch may be performed such that the slide that initiated the detour to the related slide(s) or slideshow set(s) is again presented or a next slide in the original slideshow set sequence is presented.

A determination is made as to whether the presentation has ended (step 546). If not, the operation returns to step 514. If the presentation has ended, the operation terminates.

Thus, the present invention provides automated mechanism for identifying related slides and/or slideshow sets for use in modifying an original slideshow set sequence. In this way, a user may present unscheduled detours to other slides that were not originally present in the original slideshow set sequence dynamically and in a manner where the user may return to the original slideshow set sequence easily in an automated manner. Moreover, the mechanisms of the illustrative embodiments allow a user to select to remove slides from the original slideshow set sequence that are related to a currently displayed slide. This may be done, for example, if the user feels that they have already covered the material in the discussion of the currently displayed slide and need not cover that material again at a later time in the original slideshow set sequence. Furthermore, the illustrative embodiments provide mechanisms for inhibiting these sequence modification operations based on a time progression through the presentation. All of these tools aid a user in presenting the information they believe to be most important during a slideshow presentation without wasting time with the user having to manually determine how to jump around within a slideshow presentation or between slideshow presentations.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-recordable medium providing program code recorded thereon for use by or in connection with a computer or any instruction execution system. For the purposes of this description, a computer-usable or computer-recordable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-recordable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamically modifying a sequence of a slideshow set during a presentation of the slideshow set, comprising:
    initiating presentation of an original slideshow set;
    receiving an input indicating a desire to modify a sequence of slides of the original slideshow set;
    retrieving first metadata associated with a currently presented slide in the original slideshow set;
    performing a search of slides or slideshow sets based on the first metadata to identify one or more related slides or slideshow sets having second metadata related to the first metadata; and
    modifying the sequence of slides of the original slideshow set based on the one or more related slides or slideshow sets, wherein modifying the sequence of slides of the original slideshow set comprises:
    spawning at least one additional thread for presenting the one or more related slides or slideshow sets;
    performing a first thread context switch operation to switch to the at least one additional thread from a thread used to present the original slideshow set;
    presenting the one or more related slides or slideshow sets using the at least one additional thread, wherein a same template as used to generate slides in the original slideshow set is used when presenting the one or more related slides or slideshow sets; and
    performing a second thread context switch operation, in response to a last slide of the one or more related slides or slideshow sets being reached by the one or more additional threads, to switch from the at least one additional thread, presenting the one or more related slides or slideshow sets, back to the thread used to present the original slideshow set.

2. The method of claim 1, wherein modifying the sequence of slides of the original slideshow set comprises at least one of adding one or more slides from the one or more related slides or slideshow sets to the sequence of slides of the original slideshow set or removing the one or more related slides or slideshow sets from the sequence of slides of the original slideshow set.

3. The method of claim 1, wherein the first metadata and second metadata comprises one or more tags, and wherein the one or more tags comprise at least one of pre-established subject matter identifiers, alphanumeric identifiers associated with particular topics, alphanumeric identifiers associated with projects or products, identifiers associated with portions of a project or product, or employee identifiers.

4. The method of claim 1, wherein performing a search of slides or slideshow sets based on the first metadata to identify one or more related slides or slideshow sets having second metadata related to the first metadata comprises:
    dynamically identifying the one or more related slides or slideshow sets based on an established taxonomy of metadata; and
    generating logical subsets of slides within the original slideshow set and the one or more related slides or slideshow sets.

5. The method of claim 1, wherein modifying the sequence of slides of the original slideshow set based on the one or more related slides or slideshow sets comprises:
    presenting at least one user selectable graphical user interface element associated with a function for modifying the sequence of slides of the original slideshow set;
    receiving a user selection of one of the at least one user selectable graphical user interface element; and
    modifying the sequence of slides of the original slideshow set based on the user selection of one or the at least one user selectable graphical user interface element.

6. The method of claim 5, wherein one of the at least one user selectable graphical user interface element is a graphical user interface element for accessing one of the one or more related slides or slideshow sets.

7. The method of claim 1, wherein the one or more related slides or slideshow sets are part of a same file as the original slideshow set.

8. The method of claim 1, further comprising:
    maintaining a record of the modification of the sequence of slides of the original slideshow set; and
    distributing a copy of the modified sequence of slides of the original slideshow set to one or more computing devices.

9. A computer program product comprising a computer recordable storage medium having a computer readable program stored thereon, wherein the computer readable program, when executed on a computing device, causes the computing device to:
    initiate presentation of an original slideshow set;
    receive an input indicating a desire to modify a sequence of slides of the original slideshow set;
    retrieve first metadata associated with a currently presented slide in the original slideshow set;
    perform a search of slides or slideshow sets based on the first metadata to identify one or more related slides or slideshow sets having second metadata related to the first metadata; and
    modify the sequence of slides of the original slideshow set based on the one or more related slides or slideshow sets, wherein the computer readable program causes the computing device to modify the sequence of slides of the original slideshow set by:
    spawning at least one additional thread for presenting the one or more related slides or slideshow sets;
    performing a first thread context switch operation to switch to the at least one additional thread from a thread used to present the original slideshow set;
    presenting the one or more related slides or slideshow sets using the at least one additional thread, wherein a same template as used to generate slides in the original slideshow set is used when presenting the one or more related slides or slideshow sets; and
    performing a second thread context switch operation, in response to a last slide of the one or more related slides or slideshow sets being reached by the one or more additional threads, to switch from the at least one additional thread, presenting the one or more related slides or slideshow sets, back to the thread used to present the original slideshow set.

10. The computer program product of claim 9, wherein the computer readable program further causes the computing device to modify the sequence of slides of the original slideshow set by at least one of adding one or more slides from the one or more related slides or slideshow sets to the sequence of slides of the original slideshow set or removing the one or more related slides or slideshow sets from the sequence of slides of the original slideshow set.

11. The computer program product of claim 9, wherein the first metadata and second metadata comprises one or more tags, and wherein the one or more tags comprise at least one of pre-established subject matter identifiers, alphanumeric identifiers associated with particular topics, alphanumeric identifiers associated with projects or products, identifiers associated with portions of a project or product, or employee identifiers.

12. The computer program product of claim 9, wherein the computer readable program further causes the computing device to perform a search of slides or slideshow sets based on the first metadata to identify one or more related slides or slideshow sets having second metadata related to the first metadata by:
   dynamically identifying the one or more related slides or slideshow sets based on an established taxonomy of metadata; and
   generating logical subsets of slides within the original slideshow set and the one or more related slides or slideshow sets.

13. The computer program product of claim 9, wherein the computer readable program further causes the computing device to modify the sequence of slides of the original slideshow set based on the one or more related slides or slideshow sets by:
   presenting at least one user selectable graphical user interface element associated with a function for modifying the sequence of slides of the original slideshow set;
   receiving a user selection of one of the at least one user selectable graphical user interface element; and
   modifying the sequence of slides of the original slideshow set based on the user selection of one or the at least one user selectable graphical user interface element.

14. The computer program product of claim 13, wherein one of the at least one user selectable graphical user interface element is a graphical user interface element for accessing one of the one or more related slides or slideshow sets.

15. The computer program product of claim 9, wherein the one or more related slides or slideshow sets are part of a same file as the original slideshow set.

16. A system, comprising:
   a processor; and
   a memory coupled to the processor, wherein the memory comprises instructions which, when executed by the processor, cause the processor to:
   initiate presentation of an original slideshow set;
   receive an input indicating a desire to modify a sequence of slides of the original slideshow set;
   retrieve first metadata associated with a currently presented slide in the original slideshow set;
   perform a search of slides or slideshow sets based on the first metadata to identify one or more related slides or slideshow sets having second metadata related to the first metadata; and
   modify the sequence of slides of the original slideshow set based on the one or more related slides or slideshow sets, wherein the instructions cause the processor to modify the sequence of slides of the original slideshow set by:
   spawning at least one additional thread for presenting the one or more related slides or slideshow sets;
   performing a first thread context switch operation to switch to the at least one additional thread from a thread used to present the original slideshow set;
   presenting the one or more related slides or slideshow sets using the at least one additional thread, wherein a same template as used to generate slides in the original slideshow set is used when presenting the one or more related slides or slideshow sets; and
   performing a second thread context switch operation, in response to a last slide of the one or more related slides or slideshow sets being reached by the one or more additional threads, to switch from the at least one additional thread, presenting the one or more related slides or slideshow sets, back to the thread used to present the original slideshow set.

* * * * *